United States Patent [19]

Shimamoto et al.

[11] Patent Number: 5,397,876
[45] Date of Patent: Mar. 14, 1995

[54] HIGH FREQUENCY BOLT HEATER HAVING INDUCTION HEATING COIL

[75] Inventors: Takijiro Shimamoto; Yoji Morita; Ichiro Shimasaki; Ichiro Matsuura, all of Nagasaki; Tsukasa Maenosono, Kawasaki, all of Japan

[73] Assignees: Mitsubishi Jukogyo Kabushiki Kaishi; Dai-ichi High Frequency Co., Ltd., both of Tokyo, Japan

[21] Appl. No.: 177,956

[22] Filed: Jan. 6, 1994

[30] Foreign Application Priority Data

Jan. 7, 1993 [JP] Japan .................................. 5-017109

[51] Int. Cl.$^6$ ............................................. H05B 6/14
[52] U.S. Cl. .................................. 219/644; 219/673; 219/635; 219/670; 219/676
[58] Field of Search ............... 219/644, 613, 673, 670, 219/676, 643, 635, 637

[56] References Cited

U.S. PATENT DOCUMENTS

| | | | |
|---|---|---|---|
| 2,176,601 | 10/1939 | Bates . | |
| 2,397,629 | 4/1946 | Stevens | 219/644 |
| 2,810,053 | 10/1957 | Messner | 219/644 |
| 3,236,993 | 2/1966 | Jones | 219/670 |
| 3,393,286 | 7/1968 | Zandstra | 219/613 |
| 4,100,387 | 7/1978 | Reinke et al. | 219/673 |
| 4,574,172 | 3/1986 | Burack et al. | 219/644 |
| 4,590,347 | 5/1986 | Thatcher et al. | 219/644 |

FOREIGN PATENT DOCUMENTS

| | | |
|---|---|---|
| 965761 | 7/1949 | Germany . |
| 1050935 | 2/1959 | Germany . |
| 535202 | 4/1941 | United Kingdom . |
| 565130 | 8/1977 | U.S.S.R. . |

Primary Examiner—Philip H. Leung
Attorney, Agent, or Firm—Wenderoth, Lind & Ponack

[57] ABSTRACT

A high frequency bolt heater is provided which can heat up the inside of a narrow hole much faster than a conventional bolt heater employing a resistance wire. The high frequency bolt heater includes an induction heating coil made of a copper tube bent in a hairpin fashion and whose shape is made approximately circular in section by pinching a magnet between opposed portions thereof. The heater can be inserted into a hole bored in the axial direction of a metallic bolt. A length of the coil is made approximately equal with that of the bored hole, and the magnet is omitted from a region of the heater which corresponds to a screw portion of the bolt for mounting a nut. An adjustable stopper made of a heat resistant electrical insulator is provided for setting a necessary length of the induction heating coil to be inserted into the hole, and a heat resistant insulator is provided on the surface of the induction heating coil.

14 Claims, 5 Drawing Sheets

HIGH FREQUENCY BOLT HEATER HAVING INDUCTION HEATING COIL

BACKGROUND OF THE INVENTION

1. Field of the Invention

The present invention relates to a bolt heater used for fastening and loosening bolts of a steam turbine casing, etc., applicable for a heating system for heating large size bolts of other various machines and for heating a narrow and long hole from the inside thereof, and usable where heating cannot be done from the outside such as a heat treatment within a narrow hole, heating of a boiler tube, heating of an inner tube of a double tube and improvement of stress in a welded section of a narrow hole.

2. Description of the Related Art

A bolt heater is used for fastening or loosening a large size bolt which is used for a steam turbine casing for example and which cannot be fastened by a wrench or spanner.

A case when a bolt heater is used for loosening a bolt will be explained referring to FIGS. 5 and 6. FIG. 5 shows a pair of flanges (C) strongly fastened by a bolt (a) and nuts (b). When a bolt heater (d) is inserted to a center hole (f) bored at the center of the bolt (a) in the longitudinal direction thereof and the bolt (a) is heated by the bolt heater (d), the bolt (a) thermally expands in the axial direction by a length (1) as shown in FIG. 6. Thereby, the nut (b) can be rotated easily and be loosened.

In this case, it is only necessary to heat a parallel portion (e) of the bolt (a), and it is preferable to avoid heating the screw portions of the bolt and nut to the extent possible.

In fastening the bolt, the bolt (a) is similarly heated up to thermally expand in the axial direction thereof. When the bolt (a) is expanded, the nut (b) is rotated in the direction of fastening the bolt (a). Then the bolt (a) is cooled down to obtain a predetermined fastening force.

Conventionally, a bolt heater constituted by a resistance wire heating element is inserted into center holes of bolts for lateral joint faces or the like of a steam turbine casing for use on land or aboard ship, in order to fasten or loosen the bolts.

Referring now to FIG. 4, one example of a prior art heater constituted by a resistance wire will be explained. In the figure, resistance wire heating elements 21 are embedded in a heat resistant insulator 22. A jacket 23 is made of a heat resistant metal such as SUS. A handle 27 is attached to a terminal box 24. Terminals 25 and 25' connect the resistance wire heating elements 21 with a cable 26. The reference numerals 28 and 28' indicate cross sections of an object to be heated such as a bolt.

In FIG. 4, when power is supplied by connecting the cable 26 to a power supply which is not shown, the resistance wire heating elements 21 generate heat and the jacket 23 is heated up through the intermediary of the heat resistant insulator 22.

However, because the resistance wire heating elements 21 are embedded in the heat resistance insulator 22 within a narrow stainless tube in the conventional bolt heater shown in FIG. 4, a quantity of heat input is limited, and because the heating is carried out indirectly, it is inefficient. Due to that, it takes a long time to fasten or loosen the bolts and has been a bottleneck in the assembly process for a turbine. Further, because it takes a long time for heating, and the resistance wire heating element 21 is exposed in a high temperature state for a long time, it is deteriorated appreciably.

In addition, because the nut portion and flanges of the casing are also heated up and thermally expanded due to the long heating, an error is brought about in a necessary elongation length of the bolt, thereby complicating its management.

Because the temperature does not rise quickly, not only are a number of heaters required (also for bolts whose length differ), but also there is a danger that an operator may touch the hot nuts and casing flanges.

Accordingly, it is an object of the present invention to eliminate the aforementioned problems by providing a high frequency bolt heater which can heat up the inside of a narrow hole much faster than the prior art bolt heater using the resistance wire heating element.

SUMMARY OF THE INVENTION

According to the present invention, a high frequency bolt heater comprising an induction heating coil is inserted into a hole bored in the axial direction of a metallic bolt. The coil is made approximately circular in section by pinching a magnet between reciprocating paths (i.e. opposing portions) of a copper tube turned bent in a hairpin fashion, and a length of the coil is approximately equal with that of the bored hole. The magnet is omitted at a region of the coil which, when the heater is disposed in the axial bore, corresponds in position to a screw portion of the bolt for mounting a nut.

The high frequency bolt heater of the present invention is provided with an adjustable stopper made from a heat resistant electrical insulator for setting a length of the coil to be inserted into the bolt hole.

Further, the high frequency bolt heater of the present invention uses a flexible member for connecting the induction heating coil and a high frequency transformer.

As described above, the magnet provided between the reciprocating paths (or opposing portions) of the coil bent in a hairpin fashion is omitted at the region of the coil which corresponds to the screw portion of the nut and bolt. Because a distance between the reciprocating paths of the coil where the magnet is omitted is narrow, magnetic flux which penetrates through an object to be heated is cancelled out and it is almost impossible to heat in this portion. Therefore, a range in which the magnet is provided is an effective heating zone and the inside of the narrow hole can be heated up rapidly and efficiently. The length of the zone can be changed by adjusting the length of the magnet pinched between the coils, so that this high frequency bolt heater can be used with bolts of different lengths.

The above and other related objects and features of the present invention will be apparent from a reading of the following description of the disclosure found in the accompanying drawings and the novelty thereof pointed out in the appended claims.

DETAILED DESCRIPTION OF THE PREFERRED EMBODIMENTS

Figure 1:
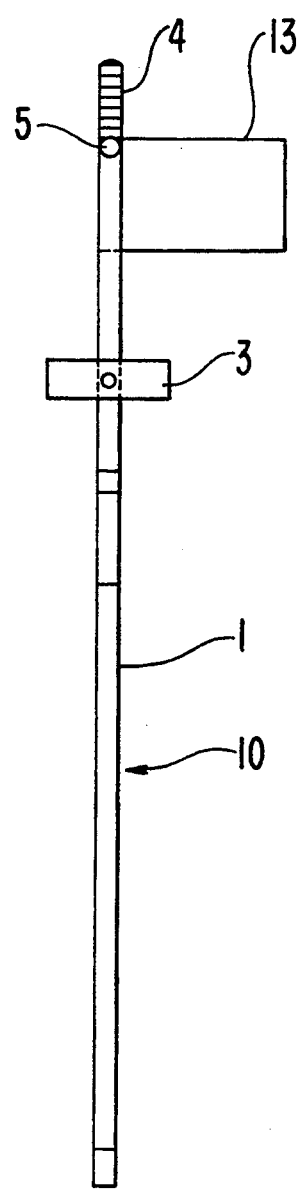
FIG. 1 is a side view of an embodiment of a high frequency bolt heater of the present invention.
Figure 2A:
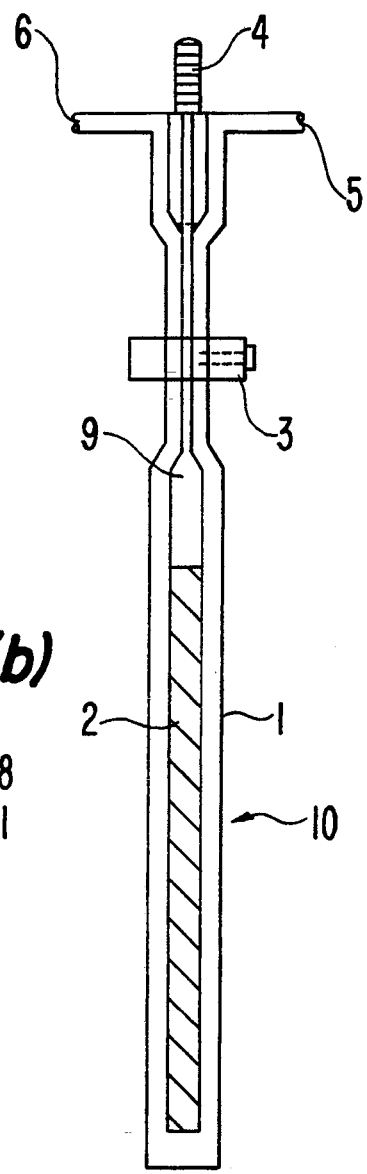
FIGS. 2a and 2b are a front view of the heater and a second view thereof respectively.
Figure 2B:
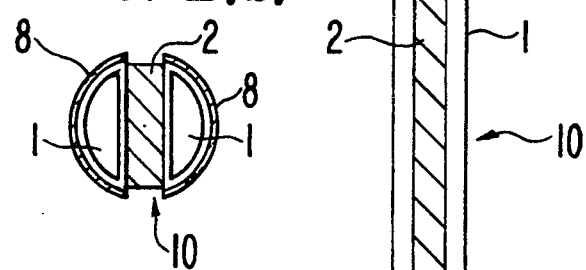
Figure 3:
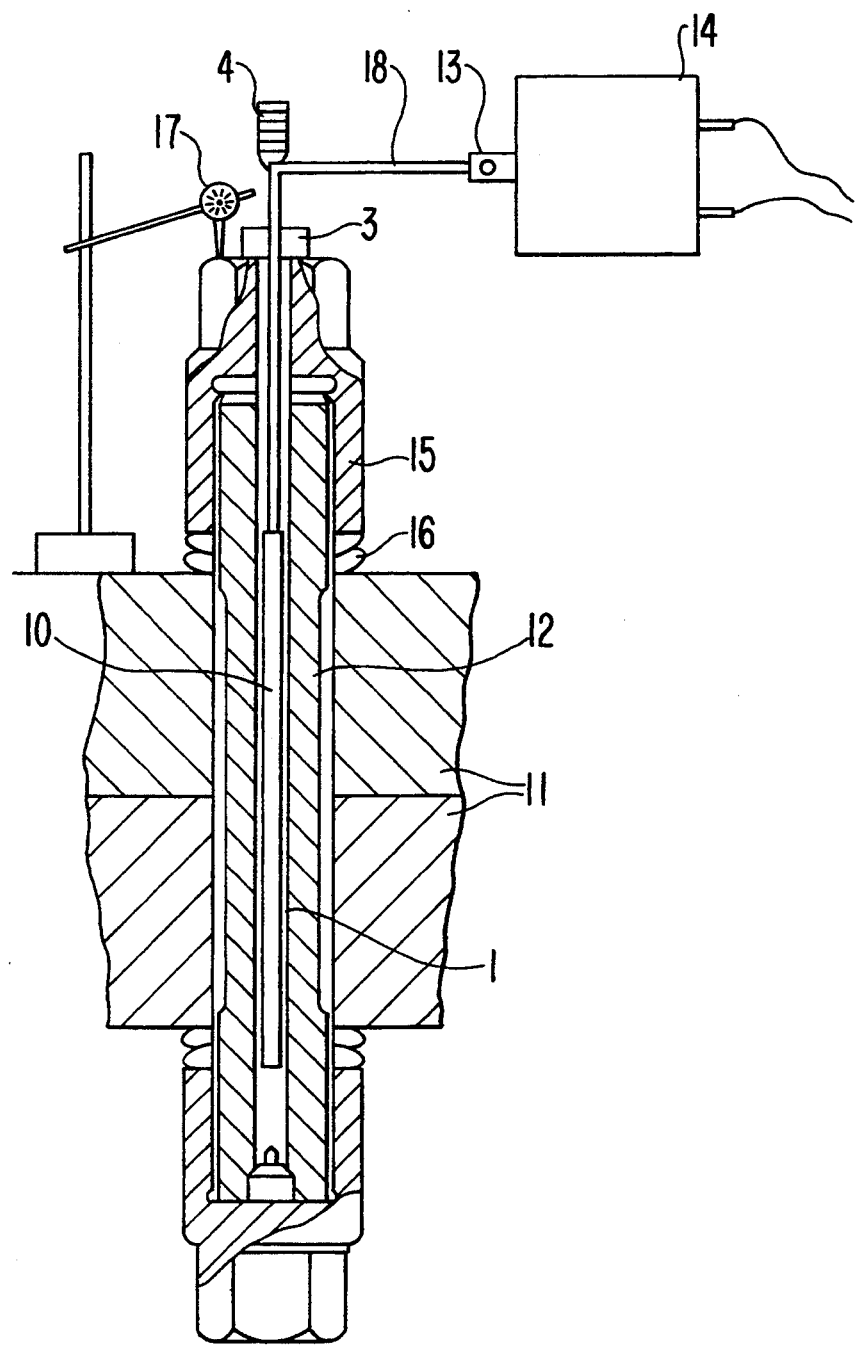
FIG. 3 is a side section view showing the present invention applied to a steam turbine.
Figure 4:
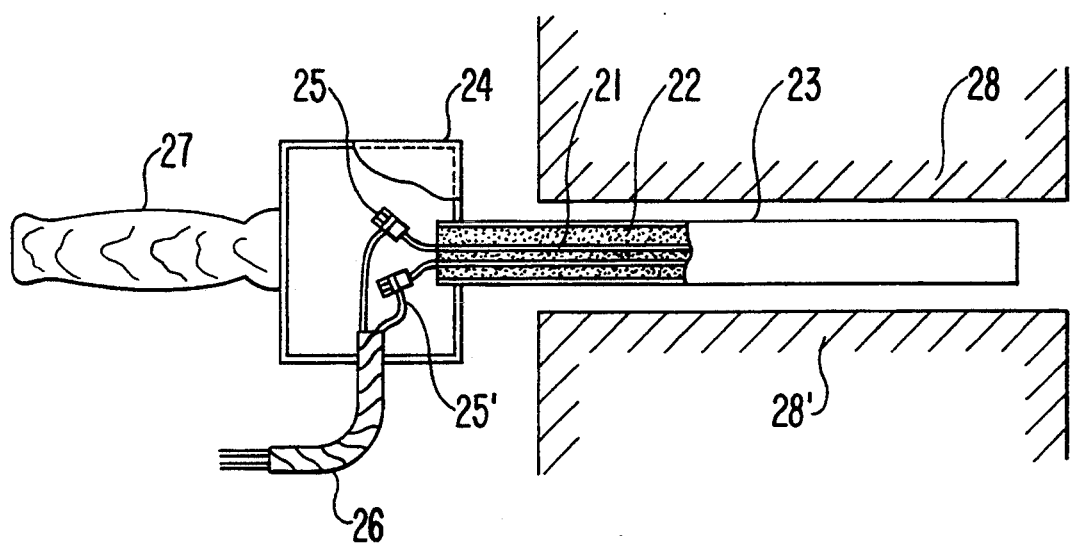
FIG. 4 is a section view of a prior art resistance wire heater.
Figure 5:
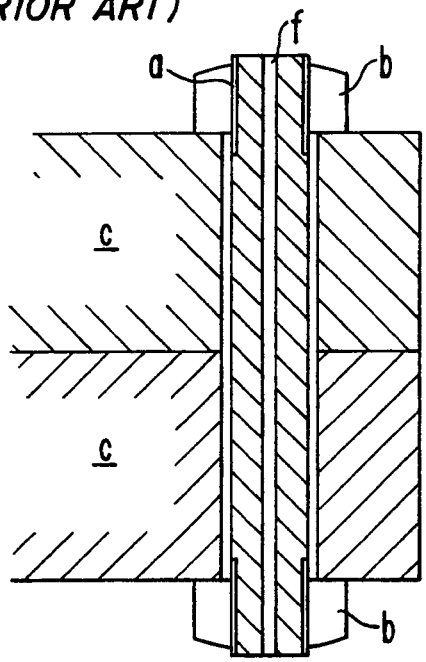
FIG. 5 is a side section view of a bolt into which the prior art bolt heater is inserted.
Figure 6:
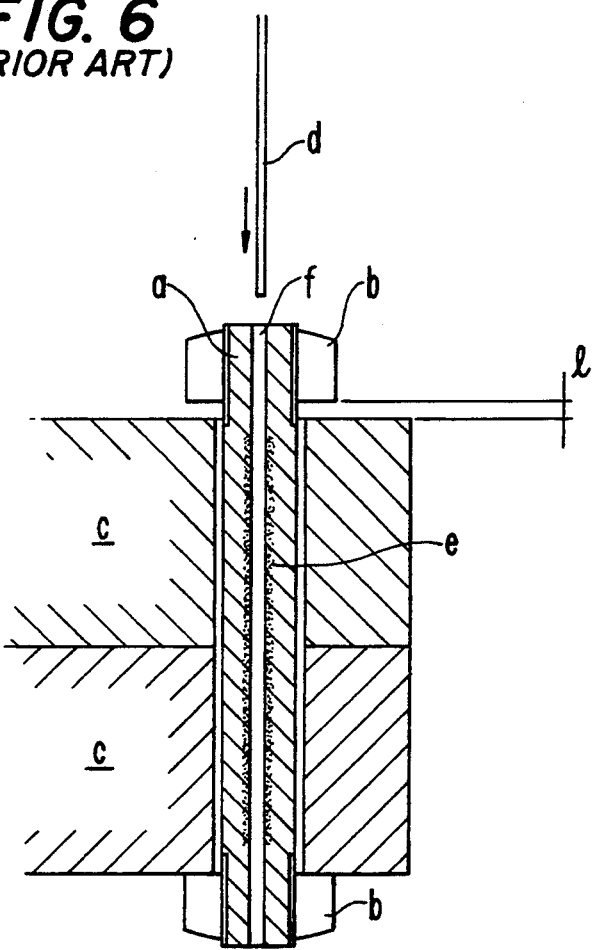
FIG. 6 is a side section view of the bolt shown in FIG. 5 showing a state when it has thermally expanded.

Referring now to the drawings wherein like reference numerals refer to like parts throughout several views, a preferred embodiment of the present invention will be explained. FIGS. 1 through 3 show the embodiment of the present invention, wherein FIG. 1 is a side view of a high frequency bolt heater of the present invention, FIG. 2a is a front view thereof, FIG. 2b is a section view thereof and FIG. 3 shows the present invention as applied to a bolt for fastening lateral joint faces of a steam turbine casing.

In the high frequency bolt heater 10 shown in FIGS. 1 and 2, a coil 1 made from a copper tube turned around in a hairpin fashion is formed into an approximately circular cross-sectional shape by removably pinching a magnet 2 between opposed portion of the coil 1. A length of the coil 1 is made equal to that of a hole bored in a metallic bolt 12 into which the bolt heater 10 is inserted. A magnet-free section 9 in which the magnet 2 is omitted is, when the heater 10 is inserted into the bolt 12, positioned at a region which corresponds to a threaded portions of the bolt 12 for use in mounting a nut 15. The magnet-free section constitutes a non-heating section.

A stopper 3 made of a heat resistant electrical insulator is provided on the coil 1 to set a length of the high frequency bolt heater 10 to be inserted into the metallic bolt 12, and the fixed position of the stopper 3 on the coil 1 can be changed by loosening a screw thereof. The surface of the high frequency bolt heater 10 is covered by a heat resistant insulator 8. The high frequency bolt heater 10 is also provided with a handle 4, an inlet port 5 for supplying water to the coil 1, an exhaust port 6 for draining water from the coil 1 and a power feeding section 13 for feeding power to the coil 1.

The high frequency bolt heater 10 will now be explained in more detail. The coil 1 is made of the copper tube which is a good electrical conductor and which is formed into a semicircular tube (i.e. a tube having a semicircular cross section) defining a water channel therein. The surface of the coil 1 covered by the heat resistant insulator 8 is insulated, for example, by thermal spray coating an alumina insulator thereon or by winding a glass tape thereabout. The outer diameter of the coil 1 is made smaller than the diameter of the hole of the bolt by 1 to 2 mm considering heating efficiency.

In operation, the coil 1 having a construction as exemplified in FIG. 2 is inserted into the center hole of the bolt 12 as shown in FIG. 3. The length of the coil 1 to be inserted is set beforehand by means of the adjustable stopper 3 provided on the coil 1. A region to be heated may be selected by loosening the screw provided on the stopper 3 and fastening it after moving the coil 1 in the axial direction.

A current flows from a power source, which is not shown, to the power feeding section 13 and to the coil 1 through the intermediary of a high frequency transformer 14. When heat is generated by the heater 10 from the inner surface of the hole of the bolt 12, the bolt 12 elongates in a few minutes due to its thermal expansion.

As shown in FIG. 3, the high frequency bolt heater 10 is inserted into the narrow hole of the metallic bolt 12, which secures lateral joint flanges 11 of a casing, until the bolt heater 10 reaches the position determined by the stopper 3, and the power feeding section 13 is connected to the high frequency transformer 14. A spherical washer 16 is disposed between the nut 15 screwed on the bolt 12 and the lateral joint flange 11. The reference numeral 17 denotes a dial gauge. A flexible member such as a flexible cable is used as a member 18 for connecting the coil 1 and the high frequency transformer 14.

In testing the invention, after the above procedures were carried out, the inventors measured temperatures at three places along the outer surface of the bolt 12 (at the longitudinally middle portion thereof, at the surface of the nut 15 and at the casing flange 11) by attaching thermoelectric thermometers and by recording via a temperature recorder from the beginning of heating to the completion of cooling.

The elongation of the bolt 12 was measured by using the dial gauge 17 while contacting it with the head of the nut 15 and securing it at a position which would not be influenced by an elongation of the casing.

Tables 1, 2 and 3 show the results of the measurements described above.

TABLE 1

| | Tested Bolts & Nuts | | |
|---|---|---|---|
| Bolt No. | Size (dia. × length) | Type | Necessary Elongation (mm) |
| 1 | 101 × 1275 | Double-end nut & bolt | 1.7 |
| 2 | 108 × 1315 | Reamer double-end nut & bolt | 1.7 |
| 3 | 101 × 925 | Stud bolt with bottom | 1.1 |

TABLE 2

| | Measured Result | | | | |
|---|---|---|---|---|---|
| Bolt No. | Heating time (sec) | Temp. of bolt (°C.) | Temp. of nut (°C.) | Temp. of flange (°C.) | Length elongated (mm) |
| 1 | 540 | 204 | normal temp. | 39 | 2.73 |
| 2 | 450 | 258 | normal temp. | 39 | 1.74 |
| 3 | 360 | 180 | normal temp. | 18 | 1.76 |

TABLE 3

| | Electrical Condition |
|---|---|
| Bolt No. | Output (kw) |
| 1 | 20 |
| 2 | 20 |
| 3 | 20 |

As described above, according to the present invention, the magnet provided along the axial direction between the reciprocating paths (i.e. opposed portions) of the coil bent in the hairpin fashion is omitted at the portion which corresponds to the screw portion of the nut and bolt when the heater is inserted in the bolt. Because a pitch of the reciprocating paths (i.e. distance between the opposed portions) of the coil where the magnet is omitted is narrow, magnetic flux which penetrates through an object to be heated is cancelled out and it is almost impossible to heat in this portion. Therefore, the range in which the magnet is provided is an effective heating zone. The length of the zone can be changed by adjusting the length of the magnet pinched between the coils, so that this high frequency bolt heater can be applied to bolts of different lengths. Accordingly, the present invention is effective to heat up the inside of a narrow hole rapidly and efficiently by causing a current to flow through the high frequency bolt heater. Thereby, with the present invention bolts can be heated about 10 times faster than with the prior art bolt heater employing the resistance wire, so that the time and labor required for assembling a steam turbine or the like may be considerably reduced.

Further, because the screw portion for mounting the nut and the flange portion of the casing are not directly heated up, the elongation of the bolt may be accurately measured. Also, because the flexible member is used for the connection between the induction heating coil and the high frequency transformer in the present invention, the connection and operation of both can be readily implemented. The heating can be suppressed and the problem of deterioration of the heater due to the repetitive heating may be eliminated by providing the water channel in the coil.

While the described embodiment represents the preferred form of the present invention, it is to be understood that modifications will occur to those skilled in that art without departing from the spirit of the invention. The scope of the invention is therefore to be determined solely by the appended claims.

What is claimed is:

1. A high-frequency bolt heater for use in heating a bolt having an axial hole, said heater comprising:
    an elongated induction coil comprising a conductive tube formed in a substantially U-shape having a pair of substantially parallel leg portions, each of said leg portions having a substantially semicircular cross-sectional shape;
    an elongated magnet sandwiched between said leg portions of said induction coil along a first portion thereof, said leg portions of said induction coil being devoid of a magnet therebetween along a second portion of said induction coil, said first portion constituting a heating portion and said second portion constituting a non-heating portion;
    wherein, along said heating portion, said leg portions together with said magnet sandwiched therebetween have a substantially circular cross-sectional shape.

2. A heater as recited in claim 1, wherein
    said conductive tube comprises a copper tube.

3. A heater as recited in claim 1, further comprising
    an adjustable stopper, formed of a heat resistant electrically insulating material and adjustably mounted to said conductive tube, for regulating a length by which said induction coil is inserted into the axial hole of the bolt.

4. A heater as recited in claim 1, further comprising
    an adjustable stopper, formed of a heat resistant electrically insulating material and adjustably mounted to said conductive tube, for regulating a length by which said induction coil is inserted into the axial hole of the bolt, and for causing said non-heating portion to be positioned at a predetermined location in the axial hole which is to not be heated.

5. A heater as recited in claim 1 wherein
    said leg portions of said conductive tube have inwardly facing exterior surfaces facing toward one another, and outwardly facing exterior surfaces facing away from one another; and
    a heat resistant insulator is provided over said outwardly facing exterior surfaces.

6. A heater as recited in claim 1, wherein
    said leg portions of said conductive tube have inwardly facing exterior surfaces facing toward one another, and outwardly facing exterior surfaces facing away from one another; and
    said outwardly facing exterior surfaces of said leg portions constitute, in cross section, a majority of an outer periphery of said substantially circular cross-sectional shape.

7. A heater as recited in claim 1, further comprising
    a high frequency transformer operably connected to said induction heating coil; and
    a flexible member connecting said induction heating coil to said high frequency transformer.

8. A high-frequency bolt heater for use in heating a bolt having a predetermined length, an axial hole, and a threaded portion for engaging a nut, said heater comprising:
    an elongated induction coil for insertion into the axial hole of the bolt and comprising a conductive tube formed in a substantially U-shape having a pair of substantially parallel leg portions, each of said leg portions having a substantially semicircular cross-sectional shape and being of a length approximately equal to a length of the axial hole;
    an elongated magnet sandwiched between said leg portions of said induction coil along a first portion thereof, said leg portions of said induction coil being devoid of a magnet therebetween along a second portion of said induction coil, said first portion constituting a heating portion and said second portion constituting a non-heating portion which, when said induction coil is inserted in the axial hole, corresponds in position along said induction coil to a position of the threaded portion of the bolt;
    wherein, along said heating portion, said leg portions together with said magnet sandwiched therebetween have a substantially circular cross-sectional shape.

9. A heater as recited in claim 8, wherein said conductive tube comprises a copper tube.

10. A heater as recited in claim 8, further comprising
    an adjustable stopper, formed of a heat resistant electrically insulating material and adjustably mounted to said conductive tube, for regulating a length by which said induction coil is inserted into the axial hole of the bolt.

11. A heater as recited in claim 8, further comprising
    an adjustable stopper, formed of a heat resistant electrically insulating material and adjustably mounted to said conductive tube, for regulating a length by which said induction coil is inserted into the axial hole of the bolt, and for causing said non-heating portion to be positioned at the threaded portion of the bolt.

12. A heater as recited in claim 8, wherein
    said leg portions of said conductive tube have inwardly facing exterior surfaces facing toward one another, and outwardly facing exterior surfaces facing away from one another; and
    a heat resistant insulator is provided over said outwardly facing exterior surfaces.

13. A heater as recited in claim 8, wherein
    said leg portions of said conductive tube have inwardly facing exterior surfaces facing toward one another, and outwardly facing exterior surfaces facing away from one another; and said outwardly facing exterior surfaces of said leg portions constitute, in cross section, a majority of an outer periphery of said substantially circular cross-sectional shape.

14. A heater as recited in claim 8, further comprising a high frequency transformer operably connected to said induction heating coil; and a flexible member connecting said induction heating coil to said high frequency transformer.

* * * * *